(No Model.)  J. GOODMAN.  2 Sheets—Sheet 1.
PLANIMETER.
No. 496,562.  Patented May 2, 1893.
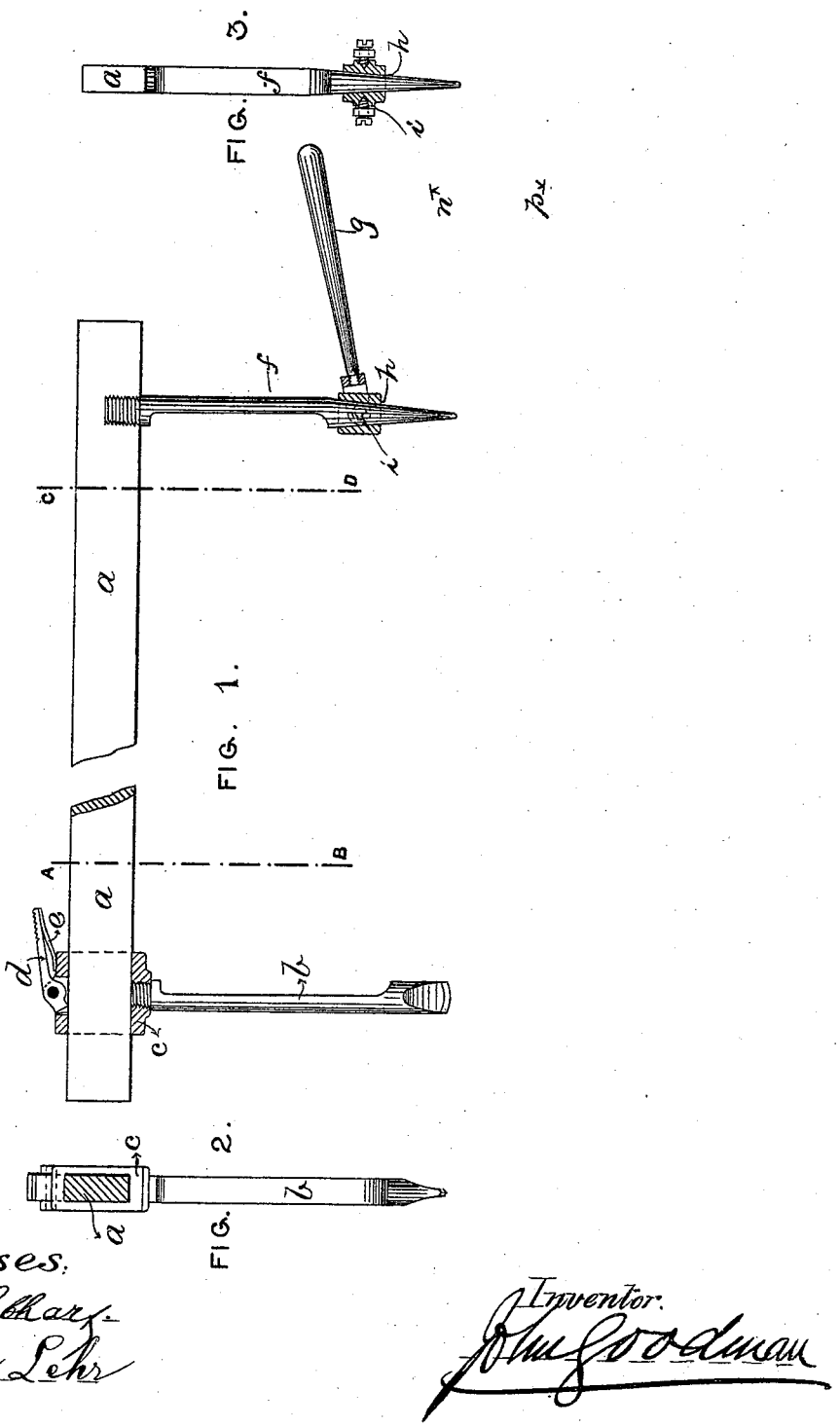
Witnesses:
Henry Lathar
Adam Lehr
Inventor:
John Goodman

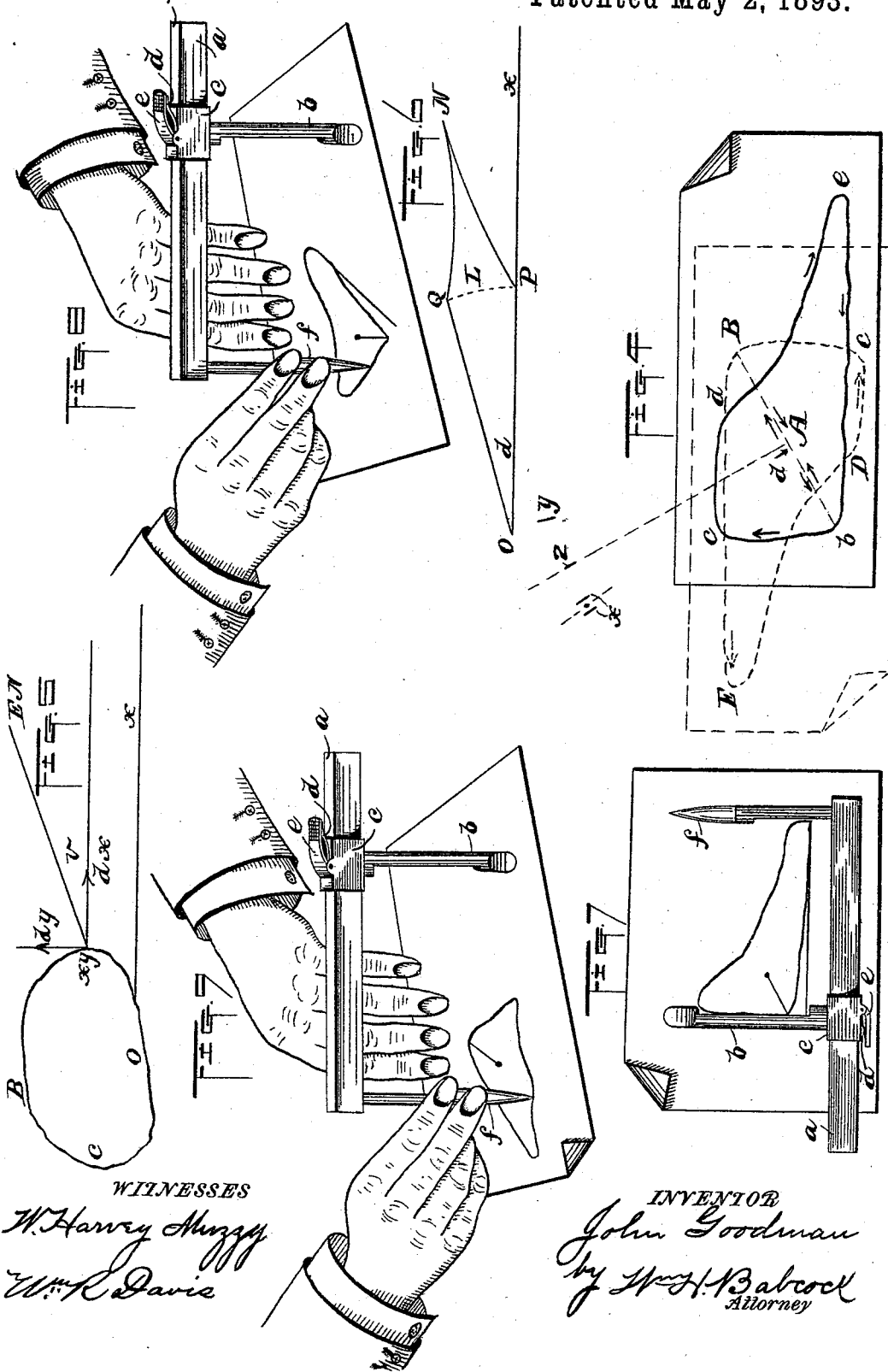

UNITED STATES PATENT OFFICE.

JOHN GOODMAN, OF LEEDS, ENGLAND.

PLANIMETER.

SPECIFICATION forming part of Letters Patent No. 496,562, dated May 2, 1893.

Application filed September 9, 1891. Serial No. 405,201. (No model.) Patented in England January 9, 1891, No. 407; in Belgium August 6, 1891, No. 72,304, and in France August 10, 1891, No. 202,216.

*To all whom it may concern:*

Be it known that I, JOHN GOODMAN, a subject of the Queen of Great Britain and Ireland, residing at Leeds, in the county of York, England, have invented new and useful Improvements in Planimeters, (for which I have applied for Letters Patent in Great Britain, No. 407, bearing date January 9, 1891; in France, No. 202,216, dated August 10, 1891, and in Belgium, No. 72,304, dated August 6, 1891,) of which the following is a specification.

My invention refers to improvements in that description of instrument known as the "Stang" planimeter (Cornelius Knudsen, of Copenhagen, maker) which consists essentially of a light rod or beam, hereinafter referred to as the beam, carrying at one end a tracing point, and at the opposite end a marker or hatchet, which are hereinafter referred to as the tracer and hatchet respectively. This hatchet has a blade or edge which disposes it to run in straight or slightly curved lines; lateral motion being resisted by the sides of the slight groove which it forms in the surface of the paper or other material over which it runs. This edge is however, so rounded from end to end as to allow a certain amount of pivotal motion.

The mode of using the Stang planimeter is as follows: The tracer is placed as near as can be judged at the center of the figure whose area is to be measured, and a dent or impression is made upon the surface of the paper with the hatchet. The tracer is then moved away from the instrument side of the figure in a straight line to a point on the boundary line of the figure, and carried completely round and along the boundary line until reaching the starting point on the boundary line, and therefrom back to the center starting point along the previously mentioned straight line. A second dent is then made with the hatchet. The area of the figure is a function of the distance between the two dents and the length of the beam; or more strictly of the angle included between the first and final positions of the beam, and the length of the beam. Now if the figure whose area is to be measured is inclosed in a rectangle, and the length of the beam be made equal to the length of the rectangle, then the distance between the hatchet dents gives the mean height of the figure. In some cases, as for example the indicator diagrams from steam and gas engines, it is rather the average height than the area of the diagram which it is desired to obtain.

Now my principal improvement consists in making the instrument of the same length as the diagram, and as the lengths of the diagrams usually vary I make either the hatchet or tracer adjustable on the beam. Or for the same reason, the beam may be made in two parts the one capable of sliding telescopically within or over the other.

To facilitate accurately adjusting the distance between the tracer and the hatchet, the vertical edges (preferably the inner ones) of the tracer and hatchet legs may be formed so as to give exactly the distance between the central longitudinal lines of the said tracer and hatchet. Such edges are formed at right angles to the beam.

I have further found that when the instrument is used as hereunder set forth, there is an almost constant error of two and a half per cent. in the result, so that I make the edges of the hatchet and tracer, so that there is a difference between the actual length of the diagram and the length of the beam to counteract the above error. Owing to the comparatively small variation in the lengths of the diagrams, this alteration of two and a half per cent. on the mean or usual length of the diagrams, is a sufficient correction for all diagrams taken with the same instrument (indicator).

The tracer or hatchet (when their distance apart has been adjusted) may be fixed in position by means of ordinary clamping screws, but preferably they are provided with a spring friction lever arrangement, so that while insuring sufficient frictional resistance to prevent any accidental or unintentional alteration of the position of the tracer or hatchet, the pressure of the lever can be at once readily released for the purpose of permitting adjustment by hand.

Figure 1 is a longitudinal elevation of my improved planimeter, in which the hatchet and tracer sockets are shown in section. Figs.

2 and 3 are cross sections on lines A B and C D respectively of Fig. 1. Fig. 4 is a diagram of an irregular figure with lines which illustrate the method of measuring the same. Figs. 5 and 6 are additional diagrams illustrating the mathematical computation embodied in the specification. Fig. 7 shows the planimeter applied to an irregular figure for the purpose of causing the working length of the beam to correspond thereto; and Figs. 8 and 9 are perspective views of the operator's hands and the planimeter in different positions taken during the operation of the instrument, the figure to be measured and the material on which it appears being also shown.

In all the figures the same letters refer to the same or corresponding parts.

$a$ is the beam.

$b$ is the hatchet.

$c$ is the hatchet leg socket.

The spring friction lever arrangement consists of the hinged lever $d$ and the flat spring $e$, the short arm of the former being kept pressed down against the beam by the upward force of the spring $e$ on the longer arm. On pulling down the longer arm the friction on the beam is relieved and the socket can be readily moved along (i. e. adjusted on) the beam.

$f$ is the tracer which may be permanently fixed to the beam as shown in the drawings, or it may be attached thereto by an adjustable socket in a similar manner to that shown for the hatchet.

In using the planimeter it is of importance to hold the tracer end very freely, so that the pressure of the hand always acts through the vertical axis of the tracer, which insures that no twisting motion is imparted to the beam except such as arises from the motion of the tracer over the boundary line and over the line to and from the starting point, from and to the boundary line. To facilitate the use of the instrument in this manner, a handle $g$ is provided having a conical socket $h$ fitted to one end of the handle by means of the trunnions or screw center studs $i$. The conical socket $h$ fits over the conical part of the tracer leg. The legs of the hatchet and tracer are as shown cut half away on their inner sides at right angles to the length of the beam in order to facilitate the accurate adjustment of the length of the beam which for the purpose of this calculation must be understood as approximately the distance between the central longitudinal lines of the tracer and hatchet which by adjustment of the latter is made to correspond with the length of the figure to be measured.

As an illustration of the mode of using my improved planimeter I will describe its application to ascertaining the mean or average pressure from a steam engine indicator diagram. The instrument is set so that the distance between the inside of the legs is equal to the length of the indicator card. A point $a$, see Fig. 4, is chosen near the center of the card (by eye) and a line $a\,b$ drawn from it to the boundary. The card is pinned down to the table, and the tracing leg of the instrument held in the right hand, the point being placed at $a$ and the hatchet at $x$, i. e. with the instrument roughly square with $a\,b$. The hatchet is pressed in order to make a slight dent in the paper at $x$. The finger having been removed from the hatchet, the tracing point of the instrument is caused to traverse the line $a\,b$ and the boundary $b\,c\,d\,e\,b$, returning to $a$ via $b\,a$. It will now now be found that the hatchet has taken up a new position, and it is again lightly pressed in order to make a fresh dent in the paper (at $y$). The instrument being held in this position the indicator card is revolved through about one hundred and eighty degrees (by eye) using the point of the instrument as a center, care being taken that neither the point nor the hatchet shift while the card is being turned. $a\,b$ will again be roughly at right angles to the beam but in a reversed position as indicated by the dotted line A B, as also the dotted lines and capital letters indicate the reversed position of the figure. The tracing point is now caused to traverse the boundary (in dotted lines) as before but in the opposite direction viz:—A B E D C B A. The hatchet will take up the new position X which may or may not coincide with $x$. The mean of $xy$ and X$y$ is the main height of the card. It is well to aim at getting the mean position of the instrument (i. e. $az$) roughly at right angles with $a\,b$ rather than making it so to start with. The hatchet should not be allowed to work on a rough surface, wood especially is unsuitable as the grain of the wood tends to make the instrument move along it.

The theory of my instrument may be demonstrated as follows.

Let O B C be the closed curve moved round by the tracing point, and $x$ and $y$ the co ordinates of any position of the tracing point, $\xi, \eta$ the co-ordinates of the corresponding position of the hatchet. It is evident that the hatchet can only slide along the line joining $xy$ to $\xi, \eta$. The point $\xi, \eta$ therefore has no motion or velocity perpendicular to the line joining $xy$ to $\xi, \eta$; that is $$a.\ dv + dy\ \text{Cos}\ v - dx\ \text{Sin}\ v = 0 \quad (1)$$

$a$ being the length of the instrument.

$$\xi - x = a\ \text{Cos}\ v.$$
$$\eta - y = a\ \text{Sin}\ v.$$

Differentiating the last two equations, we get $$d\xi = dx - a.\ \text{Sin}\ v.\ dv.$$
and
$$d\eta = dy + a.\ \text{Cos}\ v.\ dv.$$

Therefore $$\eta\ d\xi - \xi\ d\eta = (y + a.\ \text{Sin}\ v)\ (dx - a.\ \text{Sin}\ v.\ dv) - (x + a.\ \text{Cos}\ v)\ (dy + a.\ \text{Cos}\ v.\ dv)$$

or $$= y.\ dx - x.\ dy - a^2.\ dv + a\ (dx.\ \text{Sin}\ v - dy.\ \text{Cos}\ v) - a.\ dv\ (y.\ \text{Sin}\ v + x\ \text{Cos}\ v).$$

From equation (1) the third and fourth terms of this last equation equals 0. Therefore $$\int (y.\,dx - x.\,dy) = \int (\eta.\,d\xi - \xi.\,d\eta) + a\int (y\,\mathrm{Sin}\,v + x\,\mathrm{Cos}\,v)\,dv.$$

Now if the tracing point travels completely round the curve $$-\int (y.dx - x.dy) = 2\ (\text{area of curve OBC})$$
$$\text{suppose} = 2\,A.:$$

but $\xi$ and $\eta$ do not return to their original position, but the hatchet occupies a position as Q, suppose P be the original position, so that PNQ is the glissate traced out. Let the angle QOP $=\alpha$. Then taken between the limits P and Q $$-\int (\eta.d\xi - \xi.d\eta) = 2\ \text{area OPNQ}.$$
$$= 2\ \text{area PQN} + 2\ \text{area QOP}$$

where QLP is the arc struck with OP (or OQ) as radius.

$$= 2\ \text{area PQN} + a^2\alpha$$
$$\text{suppose} = 2A' + a^2\alpha.$$

Therefore $$2A = 2A' + a^2\alpha - a\int dv(x.\mathrm{Cos}\,v + y.\mathrm{Sin}\,v)$$

Integrating by parts, we obtain.

$$\int x\,d\,(\mathrm{Sin}\,v) = x\,\mathrm{Sin}\,v - \int \mathrm{Sin}\,v.dx$$

and $$-\int y.d\,(\mathrm{Cos}\,v) = -y\,\mathrm{Cos}\,v + \int \mathrm{Cos}\,v.dy.$$

or $$\int (x\,\mathrm{Cos}\,v + y\,\mathrm{Sin}\,v)\,dv = (x\,\mathrm{Sin}\,v - y\,\mathrm{Cos}\,v)$$
$$-\int (\mathrm{Sin}\,v.dx - \mathrm{Cos}\,v\,dy)$$

and by substituting from equation (1).

$$= x\,\mathrm{Sin}\,v. - y\,\mathrm{Cos}\,v. - a^2\int dv$$

and taking this between the limits corresponding to P and Q $$\int (x\,\mathrm{Cos}\,v + y\,\mathrm{Sin}\,v) = -a^2\alpha:$$

therefore $$2A = 2A' + 2a^2\alpha$$

or $$A = a.\text{arc PQ} + A'.$$

Now I have found by experiment that when the tracing point is made to follow the boundary as above described, the value of A' is two and one-half per cent. of the area to be measured. Hence I alter the length of the instrument to this extent, so that still keeping the same scale, no correction need be made for A'.

In the "Stang" planimeter (by Cornelius Knudsen of Copenhagen) the position of the instrument with regard to the line $a\,b$ was not specified. Consequently the value of A' varied. The value of A' had to be calculated by a long and tedious process which rendered the instrument practically useless to any but first-rate mathematicians. In the last equation above therefore, if the length of the instrument ($a$) is made two and one-half per cent. longer than the diagram, then A' may be eliminated from this equation and we obtain $$A = a.\text{arc PQ}.$$

or $$\frac{A}{a} = \text{mean height of diagram} = \text{arc PQ}.$$

Having now particularly described and ascertained the nature of my said invention and in what manner the same is to be employed, I claim as my invention and desire to secure by Letters Patent—

1. In a planimeter, the combination of a rigid beam with a tracer and a hatchet mounted thereon the said tracer being provided with a point for following the lines of the figure to be traced, the said hatchet being provided with an edge which is curved as described for allowing it to turn while confining the said hatchet to certain lines of motion and one of the aforesaid parts being adjustable lengthwise of the said beam to suit the length of the figure substantially as set forth.

2. In a planimeter the combination of a rigid beam with a hatchet and tracer mounted thereon the said hatchet being brought to an edge and the said tracer to a point as described and the legs of the said tracer and hatchet being cut away approximately to their central line substantially as set forth.

3. In a planimeter the combination of a rigid beam with a tracer and a hatchet mounted thereon, the former being provided with a tracing point and the latter with an edge and the hinged lever $d$ and spring $c$ whereby one of the said parts is clamped adjustably on the said beam in order that the said hatchet and tracer may be brought nearer to or farther from each other according to the length of the figure to be measured substantially as set forth.

4. In a planimeter a rigid beam and a tracer and a hatchet mounted on the said beam the former being provided with a point and the latter with an edge for bearing on the paper in combination with a handle $g$ and a conical socket $h$ and trunnions $i$ for connecting the said lever to the said tracer leg substantially as set forth.

JOHN GOODMAN.

Witnesses:
 HENRY LABHART,
 ADAM LEHR.